Sept. 20, 1927. 1,643,050
C. C. BLACKMORE
SHOCK ABSORBER
Original Filed March 13, 1924 3 Sheets-Sheet 1

INVENTOR.
Charles C. Blackmore
BY Toulmin & Toulmin,
ATTORNEYS.

Sept. 20, 1927.
C. C. BLACKMORE
1,643,050
SHOCK ABSORBER
Original Filed March 13, 1924   3 Sheets-Sheet 2
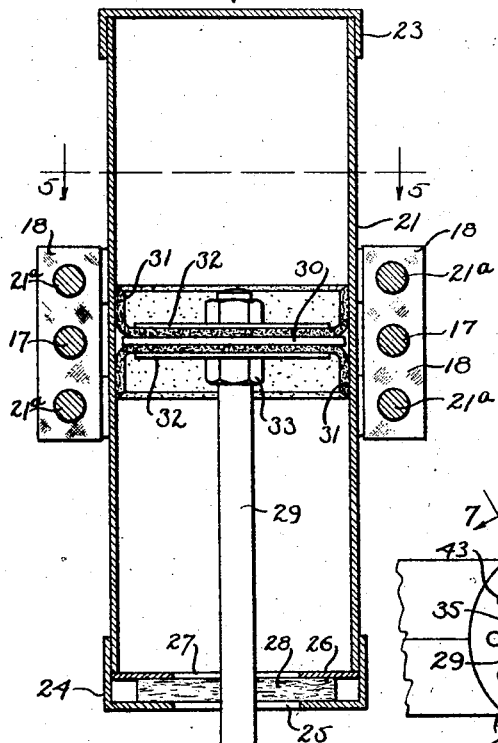
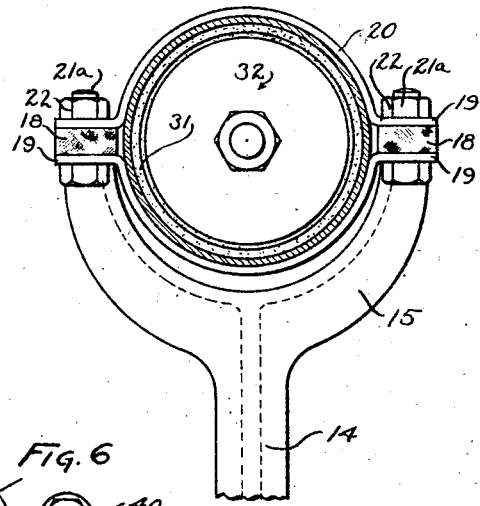
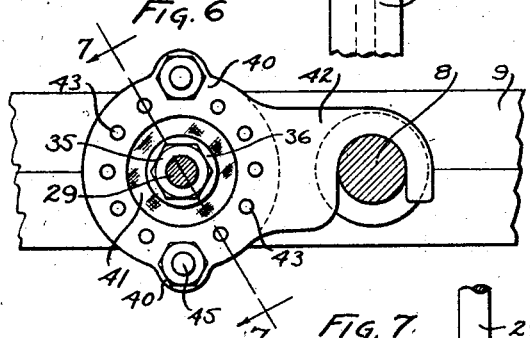
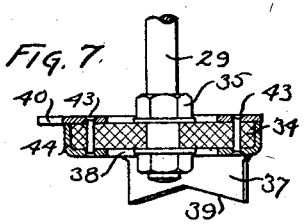
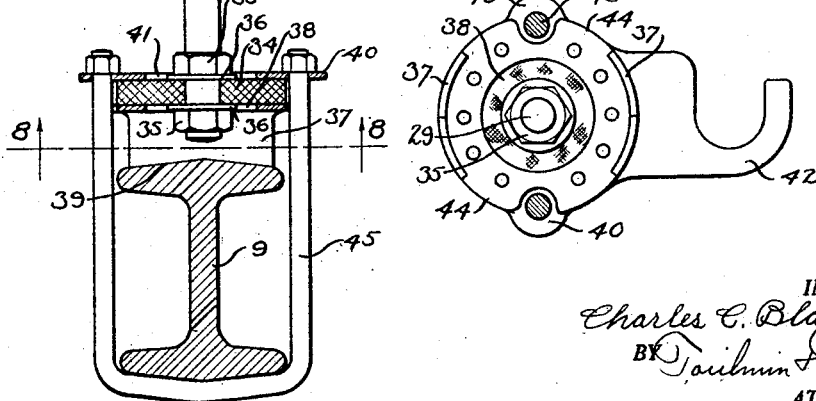
INVENTOR.
Charles C. Blackmore
BY Toulmin & Toulmin,
ATTORNEYS.

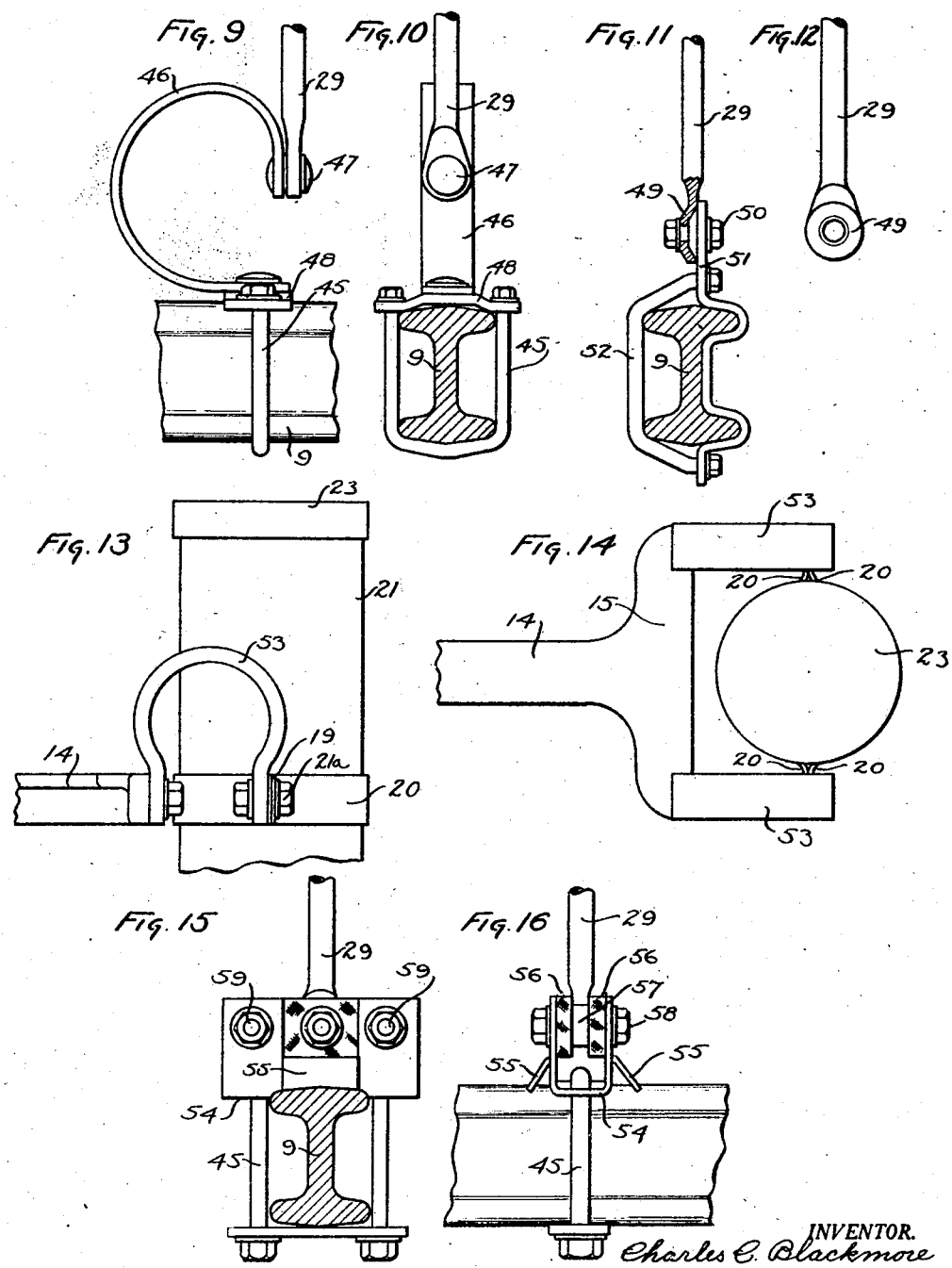

Patented Sept. 20, 1927.

1,643,050

UNITED STATES PATENT OFFICE.

CHARLES C. BLACKMORE, OF DAYTON, OHIO.

SHOCK ABSORBER.

Refile of application Serial No. 698,863, filed March 13, 1924. This application filed March 7, 1927. Serial No. 173,518.

My invention relates to shock absorbers.

I include within the general term shock absorbers those devices mounted on vehicles which dampen the spring action and dampen shock, either by absorbing it or by snubbing it.

It is the object of my invention to provide a combined shock absorbing and snubbing apparatus which will have no appreciable effect upon the operation of the vehicle within a limited range of movement, but will still have a snubbing or shock absorbing effect after the passage of the parts over a predetermined distance. The object of this is to allow the spring of the vehicle to function normally within certain limits without interference and then to be controlled when it gets to a point of action where it would be so uncontrolled, if left alone, that the results to vehicles or passengers would be unpleasant or disastrous.

It is a further object to provide such devices which may be attached and detached without disturbing an existing construction of a vehicle, so that the devices can be attached either at the factory or after leaving the factory by persons of very slight skill and with ordinary tools.

It is a further object to provide an apparatus, which, while cheap and strong, will accommodate itself to the limited area in which it is located and to the relative movement of the several parts of the vehicle without interference with the normal operation of the vehicle itself.

With these objects in mind, the following is a description of the drawings:

Figure 4 is a section on the line 4—4 of Figure 1;

Figure 5 is a section on the line 5—5 of Figure 4;

Figure 6 is a section on the line 6—6 of Figure 1;

Figure 7 is a section on the line 7—7 of Figure 6;

Figure 8 is a section on the line 8—8 of Figure 4;

Figure 9 is a detail of a modified form of attachment of the piston rod to the axle;

Figure 10 is an end elevation with the axle in section of the same mechanism as shown in Figure 9;

Figure 11 is a side elevation partially in section of another form of piston rod attachment to the axle;

Figure 12 is an end elevation of mechanism similar to that shown in Figure 11;

Figure 13 is an elevation of a modified form of attachment of the cylinder to the frame;

Figure 14 is a plan view of the same mechanism as shown in Figure 13;

Figure 15 is a side elevation with the axle in section of a modified form of piston rod attachment to the axle; and Figure 16 is a front elevation of the mechanism shown in Figure 15.

Figure 1:
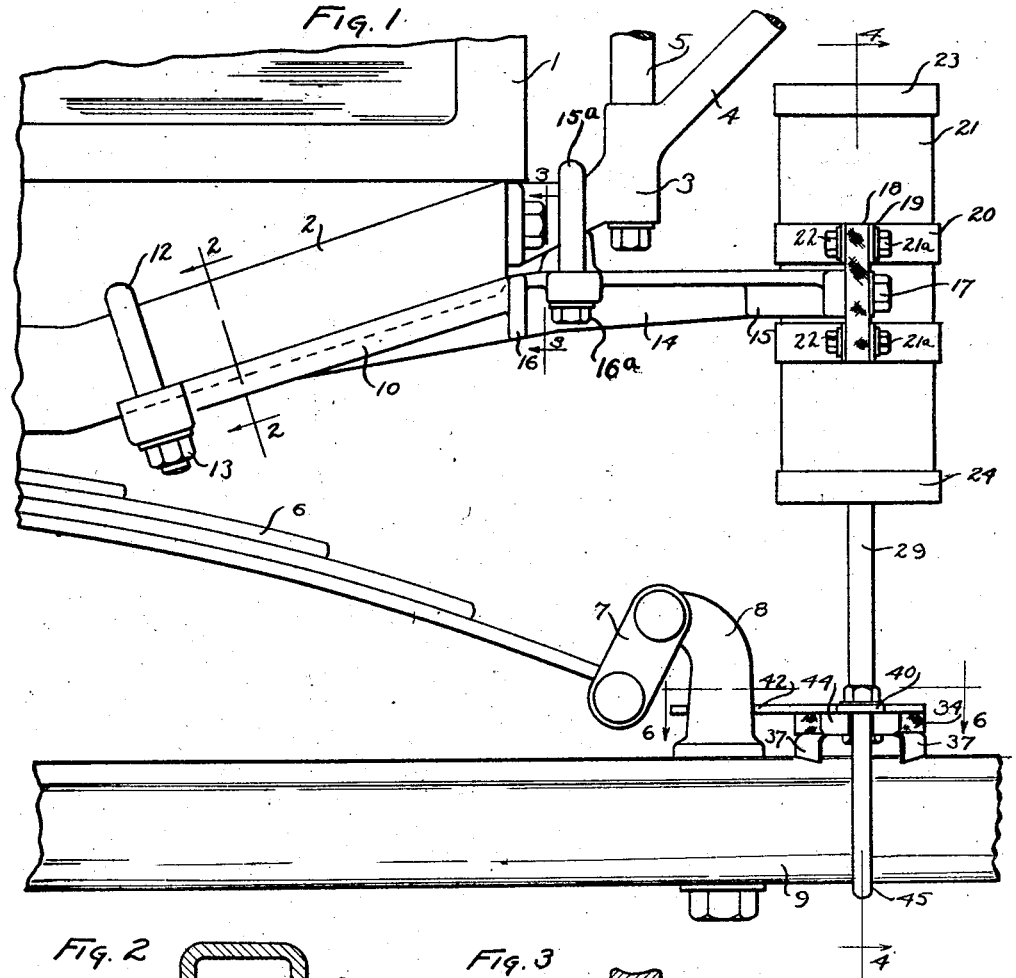
Figure 1 is a front elevation of a typical installation of my apparatus upon the front axle and front portion of the frame of a Ford automobile.
Figure 2:
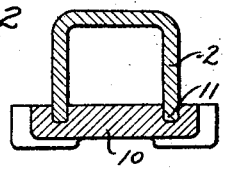
Figure 2 is a section on the line 2—2 of Figure 1.

Referring to the drawings in detail:

1 is the radiator frame of a vehicle mounted upon the cross frame member 2. This cross frame member terminates in a bracket 3. This bracket carries the braces 4 and 5. The frame 2 is mounted upon the transverse leaf spring 6, which is suspended by a shackle 7, to a spring perch 8, which is mounted in the axle 9. It is desirable to leave this mechanism undisturbed.

Figure 3:
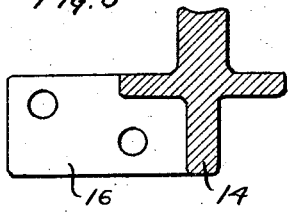
Figure 3 is a section on the line 3—3 of Figure 1.

Mounted upon the frame 2 is a combined clamp and arm which consists of a frame embracing portion 10, which has cutaway portions 11 for engagement with the U-shaped frame. One end of this frame engaging portion is clamped to the frame by the U-bolt 12 and the nuts 13. This portion of the clamping member is disposed at an angle to the horizontal. Its outwardly projecting arm 14 has its inner end clamped to the frame or the bracket on the end of the frame by the U-bolt 15$^a$ and nuts 16$^a$. The outer end of the arm 14 terminates in a yoke having arms 15. By observing Figure 3 it will be seen that a portion of this clamp and arm is projected forwardly as at 16, so that a bumper may be bolted thereto.

Turning to the yoke arms 15, it will be noted that these arms carry the bolts 17, which pass through the flexible element 18, which is usually composed of fabric and some resilient compound. This compound is used for universal joints in the driving mechanism of vehicles and the like. It is both strong and flexible.

Embracing either end of the flexible plate of material 18 above and below the point of suspension by the bolts 17 are the parallel ends 19 of the bands 20, which support the cylinder 21 by clamping it. These ends which embrace the side of the flexible plate 18 are bounded thereto by the bolts 21ª and nuts 22. Thus the cylinder can flex and twist slightly in various directions to accommodate its position to the movement of the vehicle and the other parts composing this mechanism.

The cylinder 21 is a brace or steel tube tightly clamped by the bands 20. The upper end is a screw cap 23, or there may be a cap fastened thereon by any well known means. The bottom is closed by a similar cap 24 having a large opening 25. As indicated, these caps are welded to the cylinder, but the exact manner of mounting is immaterial. A bottom plate 26 is provided having a similar enlarged opening 27 and between the caps 24 and the bottom plate 26 is located a felt washer 28, which is of lesser diameter than the cap, so that it can shift laterally. Through this washer passes the piston rod 29 which shifts the washer 28, with which it closely engages. This washer is soaked with lubricant so that it makes an effective seal against the entrance of dirt, dust, and the like. The piston rod 29 carries on its head a piston consisting of a plate 30, embraced by oppositely disposed cup-shaped washers 31. These washers in turn are embraced by the plate 32. The whole structure is held in position by the nuts 33. The plate 30 is spaced from the walls of the cylinder 21, so that there may be some rocking of the plates and rod with respect to the cylinder walls, which the yielding washer 31 will accommodate without a loss of compression.

The anchoring of the lower end of the piston rod is of importance and in the preferred form is shown flexibly anchored, so that side sway of the vehicle or some forward lunging of it will be accommodated. The lower end of this piston rod is anchored in a plate of flexible material 34 of the same character as the flexible material 18. Nuts and washers 35 and 36 attach the piston rod to the plate 34. A U-shaped supporting plate 37 is provided, having a cutaway portion 38 in the top thereof, through which the end of the piston rod passes. The rim of this plate 37 supports the edge of the flexible plate 34. The bottom of this plate 37 has V-shaped cutaway portions 39 for mounting upon the similarly formed top of the axle 9. This prevents shifting of the plate 37 on the axle.

Mounted above this flexible plate 34 and embracing it is an annular plate 40, having a cutaway portion 41 to permit of the plate 34 flexing and to permit of the piston rod 29 rocking. Preferably integrally with this plate 40 is a laterally extending hook 42, which is hooked on to the stanchion 8 to prevent the lateral shifting of the attachment. Rivets 43 pass through the plates 37, 34 and 40 to maintain the parts in alignment. In addition thereto, the edges of the plates 37 are turned up as at 44 to embrace the sides of the flexible plate 34. A U-bolt 45 passes under the axle and through the plate 40. This clamps the entire attachment to the axle.

It will thus be seen that the entire equipment will accommodate itself to the varying positions of the vehicle.

In Figures 9 and 10 there is illustrated a substantially circular spring plate 46 attached to the piston rod by the bolt 47 and to the axle by plate 48 and the U-bolt 45. In Figures 11 and 12 the lower end of the piston rod is expanded into an eye 49 and attached by a bolt 50 to a vertical clamping member 51, which conforms to the I-beam axle. This vertical clamp 51 is non-flexible and held to the axle by a U-bolt 52.

A modified form of suspending the cylinder is illustrated in Figures 13 and 14. A U-shaped spring is mounted on either arm 15, such spring being designated 53. The spring is attached to the ends 19 by the bolts 21ª to the clamps 20 on the cylinder 21.

The Figures 15 and 16 illustrate another form of piston rod attachment to the axle, consisting of the following mechanism. A U-shaped clamp 54 is mounted on the axle with positioning fingers 55. The U-bolt 45 passes through this clamp and attaches it to the axle. The upper part of the clamp between the arms thereof is filled by two plates of flexible material 56, embracing the lower end of the piston rod 29, which is provided with an eye 57. Through this eye and through the plates and clamp is passed a bolt 58. This clamp is formed with spaced arms and the ends of the flexible plates 56 are connected to these arms by the bolts 59.

Turning to the operation of this device, when the spring flexes to a limited degree there is no appreciable compression of the air suction set up in the cylinder. Thus the normal operation of the springs within limits is not disturbed.

However, if the shock is more violent than can be comfortably absorbed by the spring mechanism on the vehicle, the air above the piston will begin to compress and thus the shock will be resisted and dampened. It will be observed that the rate of this resistance will be out of synchronism with the rate of vibration of the leaf spring 6, thus still further serving to dampen the shocks passing therethrough, the nonsynchronism of resistance being due to the fact that the leaf spring has a predetermined rate of vibration, whereas the medium under compression does not have any appreciable rate of vibration. In like manner the rebound of the vehicle will be checked by the downward movement of the piston in the cylinder, as considerable suction will be set up. It will be understood that the piston is lubricated when assembled by some heavy lubricant which lasts a considerable period like vaseline.

I desire to comprehend within my invention such modifications as may be necessary to adapt it to varying conditions.

Having thus fully described my invention, what I claim as new and desire to secure by Letters Patent, is:—

1. In combination in a shock absorbing mechanism associated with a vehicle frame, spring and axle, a bracket mounted on the frame of the vehicle having one end extending outwardly from the vehicle frame, a cylinder suspended from the end of said arm and adapted to move relative thereto about the end of the arm as an axis, a piston rod and piston working in said cylinder, and means of attaching said piston rod to the axle below said cylinder.

2. In combination in a shock absorbing mechanism associated with a vehicle frame, spring and axle, a bracket mounted on the frame of the vehicle having one end extending outwardly from the vehicle frame, a cylinder suspended from the end of said arm and adapted to move relative thereto about the end of the arm as an axis, a piston rod and piston working in said cylinder, and means of attaching said piston rod to the axle below said cylinder, said bracket, arm, cylinder, piston rod, and axle being located in substantially the same plane.

3. In combination in a shock absorbing mechanism associated with a vehicle frame, spring and axle, a bracket mounted on the frame of the vehicle having one end extending outwardly from the vehicle frame, a cylinder suspended from the end of said arm and adapted to move relative thereto about the end of the arm as an axis, a piston rod and piston working in said cylinder, means of attaching said piston rod to the axle below said cylinder, said bracket, arm, cylinder, piston, piston rod, and axle being located in substantially the same plane, and said means of attachment of the bracket to the frame and of the piston rod to the axle being readily detachable so that the mechanism may be mounted and dismounted at the will of the operator.

4. In combination in a shock absorbing mechanism associated with a vehicle frame, spring and axle, a bracket having an outwardly extending arm terminating in a yoke, flexible plates carried by said yoke, bands embracing the free ends of said plates between the ends of the bands, the central portion of the bands embracing a cylinder, a cylinder, a piston and piston rod working in said cylinder, a flexible plate mounted on the axle below the cylinder, the piston rod being attached to the center of said plate.

5. In combination in a shock absorbing mechanism associated with a vehicle frame, spring and axle, a bracket having an outwardly extending arm terminating in a yoke, flexible plates carried by said yoke, bands embracing the free ends of said plates between the ends of the bands, the central portion of the bands embracing a cylinder, a cylinder, a piston and piston rod working in said cylinder, a flexible plate mounted on the axle below the cylinder, the piston rod being attached to the center of said plate, and means of preventing shifting of said plate on the axle relative to the axle.

6. In combination, a vehicle, a leaf spring and an axle located one above the other in the same plane, a bracket mounted on said frame having an outwardly extending arm in the same plane, terminating in a yoke, vertically disposed flexible plates by the ends of the yoke, embracing bands attached to the upper and lower ends of each of said plates, a vertically disposed cylinder clamped within said bands, a piston rod and piston working in said cylinder, a flexible plate mounted above said axle, means for positioning said plate or said axle to prevent shifting fore and aft and laterally, means of anchoring said flexible plate and shifting preventing means on said axle, the lower end of said piston rod being connected to said plate, the parts being so arranged that the cylinder and piston rod may rock with respect to the frame and the axle.

7. In combination, a vehicle frame, a transversely located spring and an axle, a transversely located outwardly extending cylinder support having its inner end attached to the frame and its outer end supporting a cylinder, a cylinder adapted to rock on the outer end of the bracket, a piston and piston rod working in said cylinder, means of attaching the piston rod to the axle that it may rock with respect thereto, the parts being so arranged that the action of the spring will not be affected within a limited range, but outside of that range will be progressively affected for the absorbing of shock and the snubbing of rebound.

In testimony whereof, I affix my signature.

CHARLES C. BLACKMORE.